United States Patent
Matsuo et al.

(10) Patent No.: US 6,345,049 B1
(45) Date of Patent: Feb. 5, 2002

(54) NETWORK SYSTEM AND COMMUNICATION DEVICE

(75) Inventors: Shinichiro Matsuo; Tsuyoshi Kawamoto, both of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/181,165

(22) Filed: Oct. 28, 1998

(30) Foreign Application Priority Data

Oct. 28, 1997 (JP) ............................................. 9-311160

(51) Int. Cl.$^7$ .............................................. H04L 12/66
(52) U.S. Cl. ...................... 370/354; 370/217; 370/356; 370/386; 370/281
(58) Field of Search ......................... 370/395, 216–220, 370/241–244, 221, 223, 410, 522; 375/224; 379/207, 210, 230; 714/1–4, 100

(56) References Cited

U.S. PATENT DOCUMENTS 6,172,973 B1 * 1/2001 Akhtar ........................ 370/354

* cited by examiner

*Primary Examiner*—Douglas Olms
*Assistant Examiner*—Van Kim T. Nguyen
(74) *Attorney, Agent, or Firm*—Roseman + Colin LLP

(57) ABSTRACT

A network system of the present invention has a TDM network including TDM switches and an ATM network including communication devices connected the TDM switches. Each of the communication devices comprises a first call setting unit setting, when receiving a call setting request from the transmitting side TDM switch, a call between this communication device and the receiving side communication device, a specifying unit specifying, if the first call setting unit is unable to set the call, any one of TDM switches as a detour TDM switch, a storing unit stored with detour information for setting the call between the detour TDM switch and the receiving side TDM switch, a reading unit reading the detour information when the specifying unit specifies the detour TDM switch, a second call setting unit setting a call between the communication device and a detour communication device, and a unit making, when the second call setting unit sets the call, the detour communication device transmit a call setting request containing the detour information read by the reading unit to the detour TDM switch.

18 Claims, 20 Drawing Sheets

TDM LINE CAPACITY MANAGEMENT TABLE

| NARROW-BAND CALL-IN ADDRESS NUMBERS | AWN-TDM SW LINE CAPACITIES |
|---|---|
| 700 | 2M×5bps |
| 710 | 2M×10bps |
| 720 | 2M×15bps |
| 730 | 2M×10bps |
| . | . |
| . | . |
| . | . |

TDM LINE CALL LOSS RATE MANAGEMENT TABLE

| NARROW-BAND CALL-IN ADDRESS NUMBERS | CALL LOSS RATES |
|---|---|
| 700 | 5% |
| 710 | 8% |
| 720 | 2% |
| 730 | 4% |
| . | . |
| . | . |
| . | . |

```
  ┌─────────────────────┐
  │ DETOUR INFORMATION  │
  │ EXTRACTING PROCESS  │
  └─────────────────────┘
            │
            ▼
```

EXTRACT CALL-IN NODE ADDRESS NUMBER (720) WITH MINIMUM CALL LOSS RATE BY RETRIEVING TDM LINE CALL LOSS RATE MANAGEMENT TABLE OF TDM-SW 113 SPECIFIED BY CALL-IN ADDRESS (730)  — S601

DETERMINED awn2 CORRESPONDING TO NARROW-BAND CALL-IN ADDRESS NUMBER (720) FROM NARROW-BAND CALL-IN ADDRESS NUMBER/BROAD-BAND ATM ADDRESS CONVERSION TABLE  — S602

OUTPUT, AS OUTPUT OF DETOUR ROUTE DECISION UNIT, ATM ADDRESS awn2 AND DIAL-IN NUMBER CORRESPONDING TO TERMINAL 115 OF NARROW-BAND DETOUR INFORMATION BY WAY OF DETOUR INFORMATION OF TDM-SW 113  — S603

```
       ┌────────┐
       │ RETURN │
       └────────┘
```

FIG.12 (a)

TDM LINE CONGESTION STATE MANAGEMENT TABLE

| NARROW-BAND CALL-IN ADDRESS NUMBERS | CONGESTION STATES |
|---|---|
| 700 | NO CONGESTION |
| 710 | BEING CONGESTED |
| 720 | NO CONGESTION |
| 730 | NO CONGESTION |
| . | . |
| . | . |
| . | . |

DETOUR INFORMATION EXTRACTING PROCESS

↓

EXTRACT CALL-IN NODE ADDRESS NUMBER (720) WITH NO CONGESTION BY RETRIEVING TDM LINE CONGESTION STATE MANAGEMENT TABLE OF TDM-SW 113 SPECIFIED BY CALL-IN ADDRESS (730) — S701

↓

DETERMINED awn2 CORRESPONDING TO NARROW-BAND CALL-IN ADDRESS NUMBER 720 FROM NARROW-BAND CALL-IN ADDRESS NUMBER/BROAD-BAND ATM ADDRESS CONVERSION TABLE — S702

↓

OUTPUT, AS OUTPUT OF DETOUR ROUTE DECISION UNIT, ATM ADDRESS awn2 AND DIAL-IN NUMBER CORRESPONDING TO TERMINAL 115 OF NARROW-BAND DETOUR INFORMATION BY WAY OF DETOUR INFORMATION OF TDM-SW 113 — S703

↓

RETURN

FIG.13

BUSY ADVANCE TABLE

| DETOUR INFORMATION TO TDM-SW | USE/NON-USE OF BUSY ADVANCE |
|---|---|
| RECEIVED BY TED-SW 113 | BUSY ADVANCE FUNCTION OF TDM-SW 112 (ADDRESS "720") IS USABLE |
| RECEIVED BY TED-SW 112 | · |
| RECEIVED BY TED-SW 111 | · |

~6m

NETWORK SYSTEM AND COMMUNICATION DEVICE

BACKGROUND OF THE INVENTION

The present invention relates to a network system constructed of a narrow-band network such as a TDM (Time Division Multiplex) network and of a broad-band network (integrated network) such as an ATM (asynchronous transfer mode) network, and to communication devices constituting the broad-band network.

In recent years, a technology of an asynchronous transfer mode (ATM) has increasingly advanced and spread. As a relay network of data between terminal devices, there appears an integrated network based on one of technologies using an ATM network, wherein conventional time division multiplex (TDM) lines are relayed to ATM lines. The integrated network, for example, is accommodated a plurality of TDM networks (a plurality of TDM-SWs), The integrated network relays data transmitted between the TDM networks.

In the case of constructing the integrated network, it is desired that a detour function be actualized by the integrated network. The detour function is a function that a transmission route of data is charged another route so as to avoidance of a fault occured in a network and the data is transmitted a destination of the data.

Herein, the detour function is explained. FIGS. 16 and 17 are explanatory diagrams each showing the detour function in the TDM network. As shown in FIG. 16, when the TDM network is normal (no fault), it is assumed that, for example, the data transferred from a terminal device 114 to a terminal device 115 be transferred on a route such as the terminal device 114→a TDM-SW (TDM switch)→a DMIX (multiplexer) 501→a DMIX 502→a TDM-SW 112→a DMIX 502→a DMIX 503→a TDM-SW 113→the terminal device 115.

Herein as shown in FIG. 17, for instance, if a fault occurs in the TDM line (a relay line) for connecting the DMIX 503 to the TDM-SW 113, the data transferred from the terminal device 114 to the terminal device 115 can not be transferred on the route described above. Therefore, the TDM-SW 112 changes the route such as the TDM-SW 112→a public network 116→the TDM-SW 113→the terminal device 115, thus detouring around the line in which the fault occurs.

Incidentally, a plurality of TDM-SWs (e.g., PBXs (Private Branch Exchanges)) constituting the TDM network set a path in a link-by-link manner by terms of a characteristic of the TDM. If the relay line in which a link should be set can not be connected, the TDM-SW accommodating this relay line sets the link in other relay line by executing a detour function.

In contrast with this, as shown in FIG. 18, when the TDM networks are bridged by the ATM network, each of ATM-WAN (Wide Area Network) nodes (hereinafter abbreviated to "AWNS" 600–603 constituting the ATM network, is capable of directly setting a VC (Virtual Channel) from a transmitting side AWN to a receiving side AWN.

For example, as shown in FIG. 18, when data communications are carried out between the terminal device 114 and the terminal device 115, the terminal device 114 transmits to the TDM-SW 111 call-out information (such as dial information) etc) containing call-in address information (a destination address). The call-in address information includes an intra TDM network node address number "730" for specifying the TDM-SW 113 and an intra TDM-SW 113 terminal device address number "2000" for specifying the terminal device 115.

The TDM-SW 111 transmits, to an AWN 601, call setting signaling (a call setting message) containing the call-in address information requesting the terminal device 115 to receive. The AWN 601, when receiving the call setting signaling from the TDM-SW 111, controls a transmission of the call setting signaling in accordance with a procedure of "STR-VTOA-LLT-01.12" based on recommendations of ATM-Forum.

Namely, the AWN 601 detects an intra broad-band network ATM address "awn3" corresponding to the call-in address information "730" contained in the call setting signaling, and edits a broad-band call setting message. Next, the AWN 601 transmits the broad-band call setting signaling toward the AWN 603 in order to set a narrow-band signaling transmission VC. As a result, the narrow-band signaling transmission VC is directly set between the AWN 601 and the AWN 603.

Incidentally, as shown in FIGS. 19 and 20, a fault or a line busy etc occurs in the TDM line through which the AWN 601 is connected to the TDM-SW 111, the AWN 601 is unable to receive the call setting signaling from the TDM-SW 111. Therefore, the narrow-band signaling transmission VC can not be set between the AWN 601 and the AWN 603. In this case, for example, the TDM-SW 111 makes route such as the public network 116→the TDM-SW 112→the AWN 602→the AWN 603→the TDM-SW 113, whereby the call setting signaling can be received by the TDM-SW 113.

In the conventional ATM network (each of the AWNs 601–603) has not detour function descrived above. Hence, if the transmitting side TDM-SW (which is herein the TDM-SW 111) actualizes the detour function described above, the transmitting side TDM-SW holds all pieces of detour information in the ATM network, and must control the detour (routing) in the ATM network.

On the other hand, in terms of a promotion of utilizing the ATM network as a relay network for bridging the TDM networks, it is desirable that the ATM network be constructed so that the ATM network accommodates the TDM network without changing the configuration of the existing TDM network (a PBX network). That is, if the narrow-band signaling transmission VC ca not be set, the transmitting side AWN (the AWM 601 in FIG.19), it is desirable, actualizes the detour function.

SUMMARY OF THE INVENTION

It is a primary object of the present invention, which was devised to overcome the problems described above, to provide a network system and a communication device that are capable of actualizing a detour function without changing a configuration of an existing TDM network.

To accomplish the above object, the present invention adopts the following construction.

According to a first aspect of the present invention, A network system of the present invention comprises a TDM network including a plurality of TDM switches connected to each other via TDM lines and an ATM network including a plurality of communication devices connected via the TDM lines in such a state as to be paired with the TDM switches. Each of the communication devices in this network system comprises a first call setting unit for setting, when receiving a call setting request message from the transmitting side TDM switch, a call between this communication device and a receiving side communication device paired with the receiving side TDM switch indicated by the call setting request message, a specifying unit for specifying, if the first call setting unit is unable to set the call, any one of TDM switches excluding the receiving side TDM switch as a detour TDM switch, a storing unit stored with detour information for setting the call between the detour TDM switch specified by the specifying unit and the receiving side TDM switch, a reading unit for reading the detour information when the specifying unit specifies the detour TDM switch, a second call setting unit for setting a call between the communication device and a detour communication device defined as a communication device paired with the detour TDM switch specified by the specifying unit, and a unit for making, when the second call setting unit sets the call, the detour communication device transmit a call setting request message containing the detour information read by the reading unit to the detour TDM switch. The detour TDM switch sets the call between the detour TDM switch and the receiving side TDM switch on the basis of the detour information contained in the call setting request message received from the detour communication device.

According to the first aspect of the present invention, when each communication device receives the call setting request message from the transmitting side TDM switch, the first call setting unit sets the call between the transmitting side communication device and the receiving side communication device. If the call can not be set, the specifying unit specifies the detour TDM switch, and the second call setting unit sets the call between the transmitting side communication device and the detour communication device. Thereafter, the call setting request containing the detour information is transmitted to the detour TDM switch from the detour communication device, and the detour TDM switch sets the call between the detour TDM switch and the receiving side TDM switch on the basis of the detour information. According to the present invention, the detour function can be actualized in the ATM network, and hence a communication efficiency can be enhanced.

Exemplified as the communication device are a variety of communication devices used as nodes in the ATM network it such as an ATM switch, an ATM-HUB, an ATM router etc.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Other objects and advantages of the present invention will become apparent during the following discussion in conjunction with the accompanying drawings, in which:

FIG. 11 is an explanatory diagram showing a modified embodiment of the embodiment 1;

FIG. 12 is an explanatory diagram showing a modified embodiment of the embodiment 1;

FIG. 13 is an explanatory diagram showing a busy advance table in an embodiment 1;

DESCRIPTION OF THE PREFERRED EMBODIMENTS

Embodiments of the present invention will hereinafter be described with reference to the accompanying drawings.

[Embodiment 1]

To start with, a network system in an embodiment 1 will be explained.

[Whole Construction of Network System]

Figure 1:
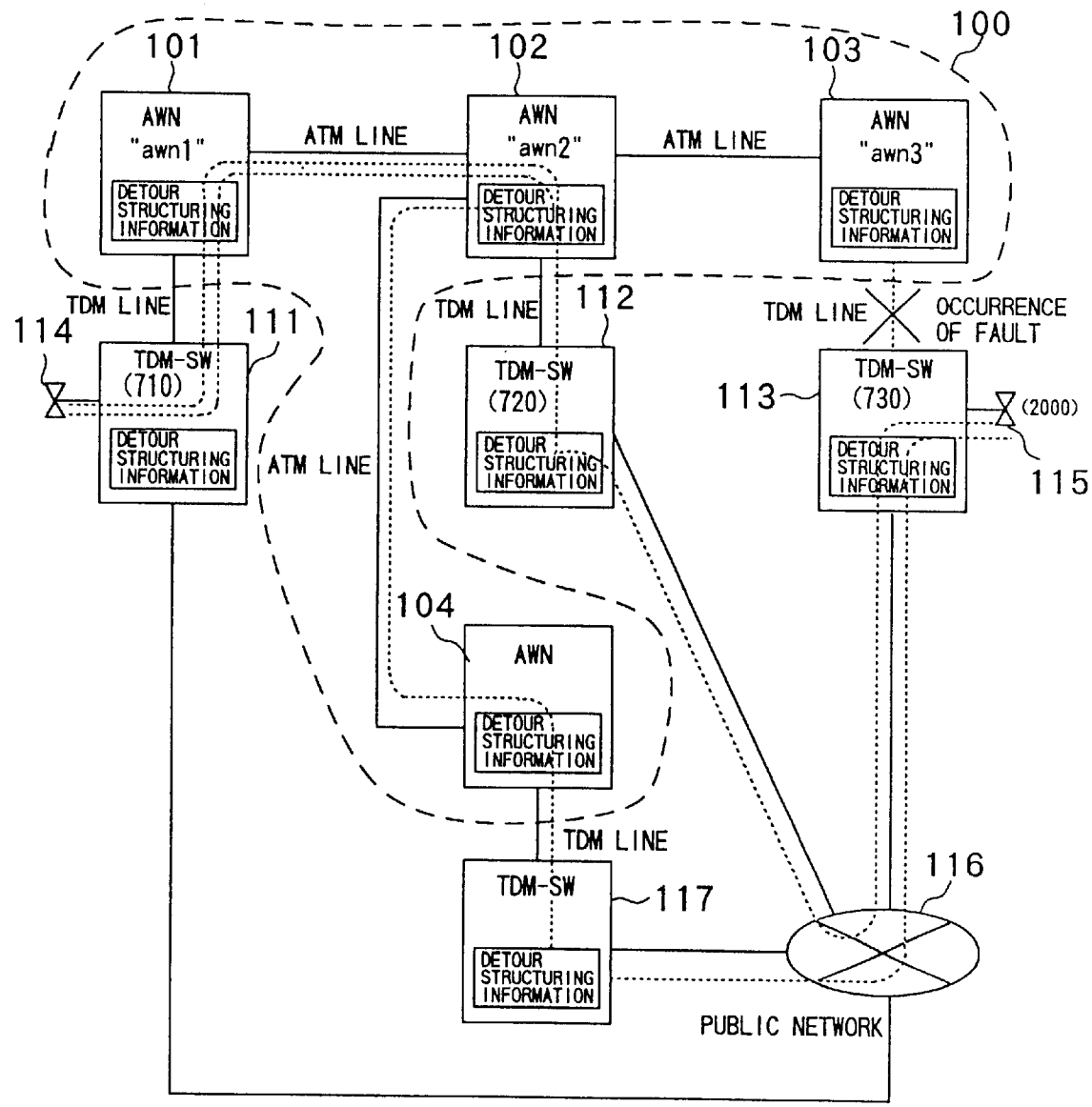
FIG. 1 is a diagram showing a whole construction of a network system in an embodiment of the present invention.

FIG. 1 is a diagram showing an example of a network system architecture in the embodiment 1 of the present invention. Referring to FIG. 1, the network system is constructed of an ATM network (integrated network) 100, a TDM network including TDM-SWs (TDM switches) 111–113, 117 and connected to via a TDM line to the ATM network 100, and a public network 116 connected via communication lines to the TDM-SWs 111–113, 117.

The ATM network 100 comprises an AWN (ATM-WAN node) 101 defined as an ATM communication device connected via the TDM line to the TDM-SW 111, an AWN 102 connected via the ATM line to the AWN 101 and also connected via the TDM line to the TDM-SW 112, an AWN 103 connected to via the ATM line to the ATM 102 and also connected via the TDM line to the TDM-SW 113, and an AWN 104 connected to via the ATM line to the ATM 102 and also connected via the TDM line to the TDM-SW 117.

Thus, the AWN 101 is connected to the TDM-SW 111, the AWN 102 is connected to the TDM-SW 112, the AWN 103 is connected to the TDM-SW 113, and the AWN 104 is connected to the TDM-SW 117 in a paired state (1:1). The AWNs 101–104 correspond to the communication devices according to the present invention, and the TDM-SWs 111–113, 117 correspond to the TDM switches according to the present invention.

Each of the TDM-SWs 111–113, 117 is classified as a PBX (Private Branch Exchange). The TDM-SW 111 accommodates a terminal device (hereinafter simply referred to as a "terminal") 114, and the TDM-SW 113 accommodates a terminal 115 (of which a terminal address number is "2000"). A station number (a node address of the TDM network) "710" is allocated to the TDM-SW 111, a station number "720" is allocated to the TDM-SW 112, and a station number "730" is allocated to the TDM-SW 113.

Figure 18:
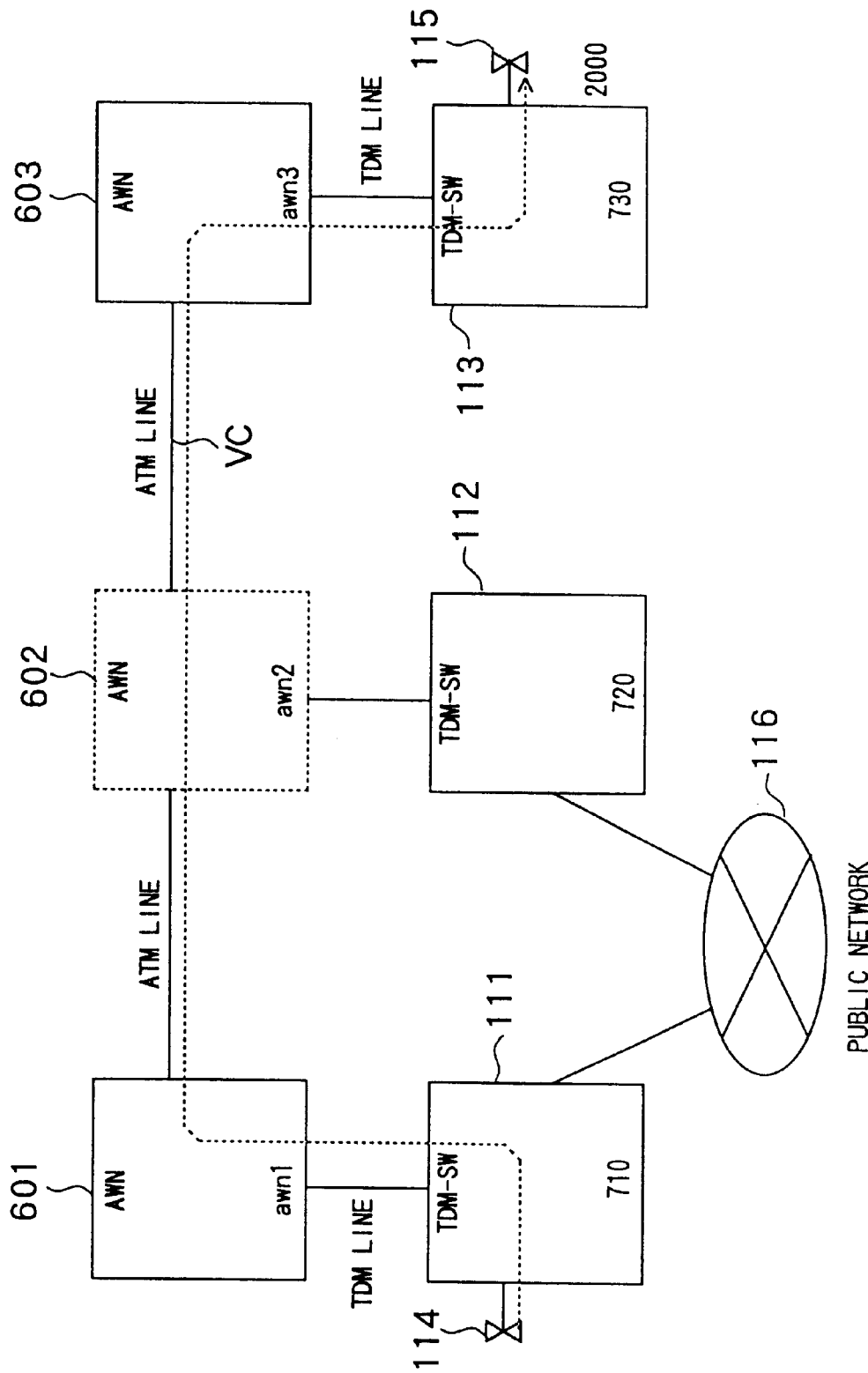
FIG. 18 is an explanatory diagram showing a problem inherent in the prior art.
Figure 19:
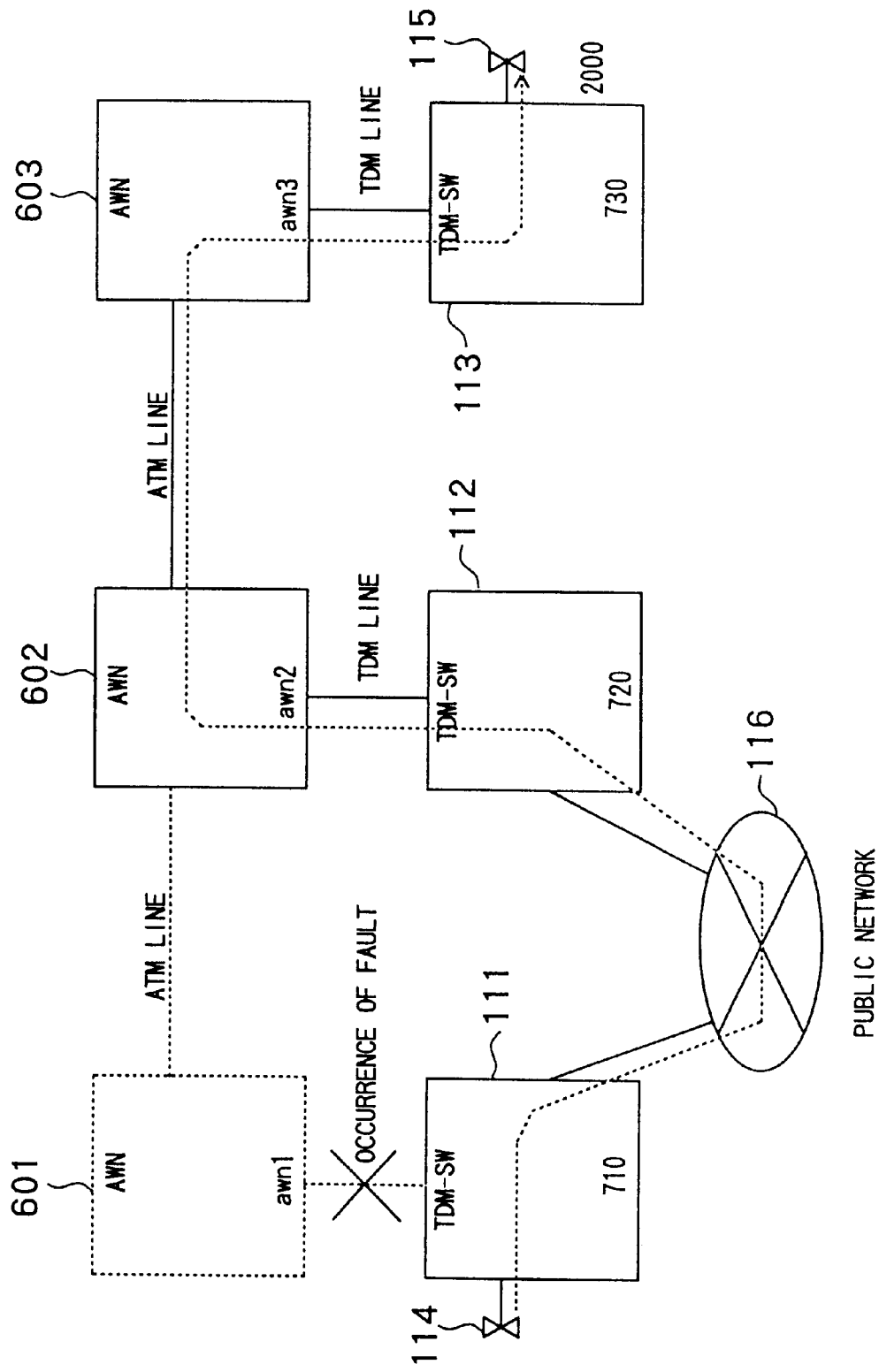
FIG. 19 is an explanatory diagram showing a problem inherent in the prior art.
Figure 20:
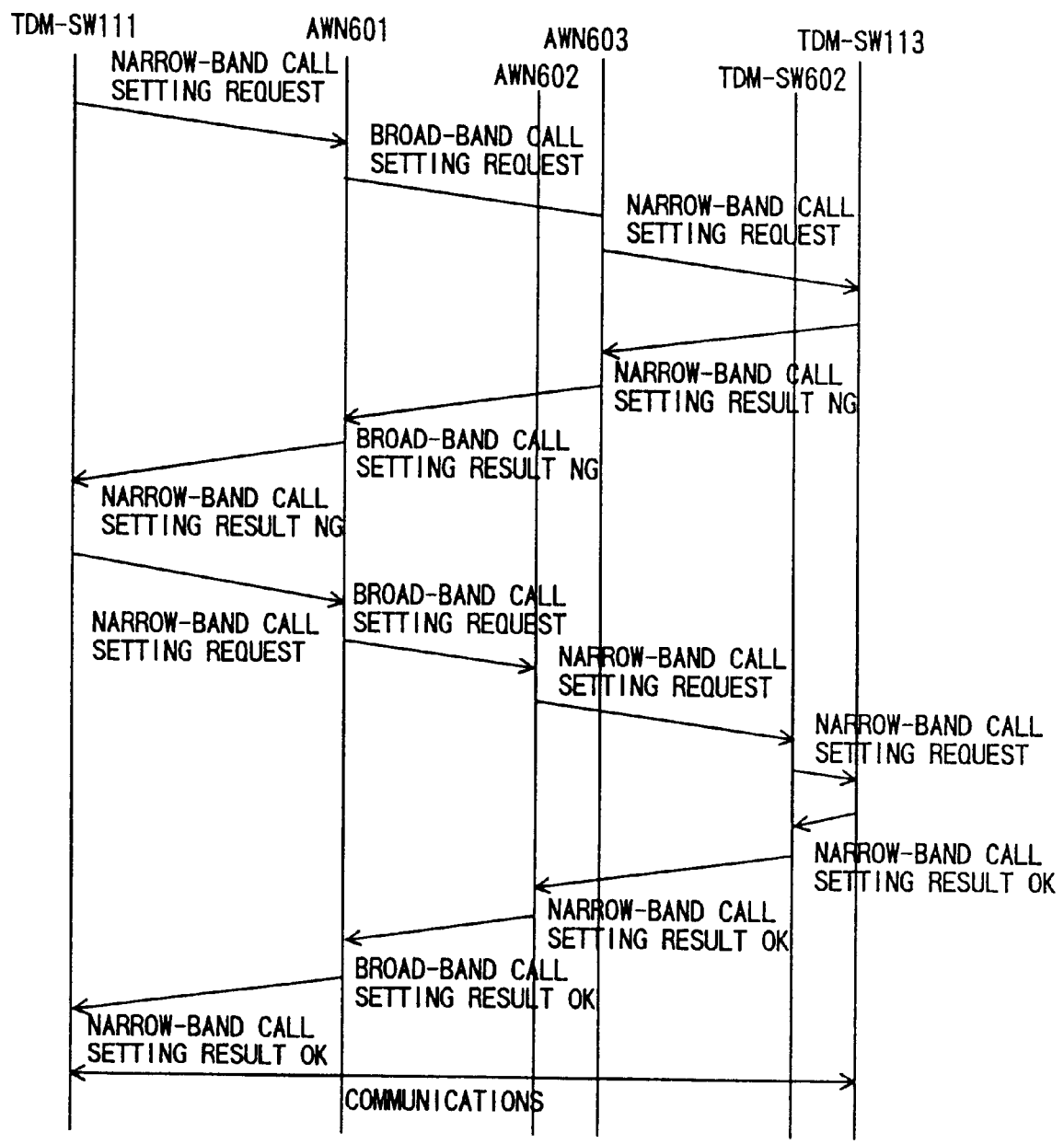
FIG. 20 is an explanatory diagram showing a problem inherent in the prior art.

Note that the TDM-SW 111–113, the TDM-SW 117 the terminals 114, 115, and the public network 116 are the same as those shown in FIGS. 18 and 19, and hence a detailed explained thereof is omitted.

[Construction of AWN]

Next, constructions of the AWNs 101–104 shown in FIG. 1 are explained. The AWNs 101–104, however, have the same construction, and therefore the AWN 101 is exemplified.

Figure 2:
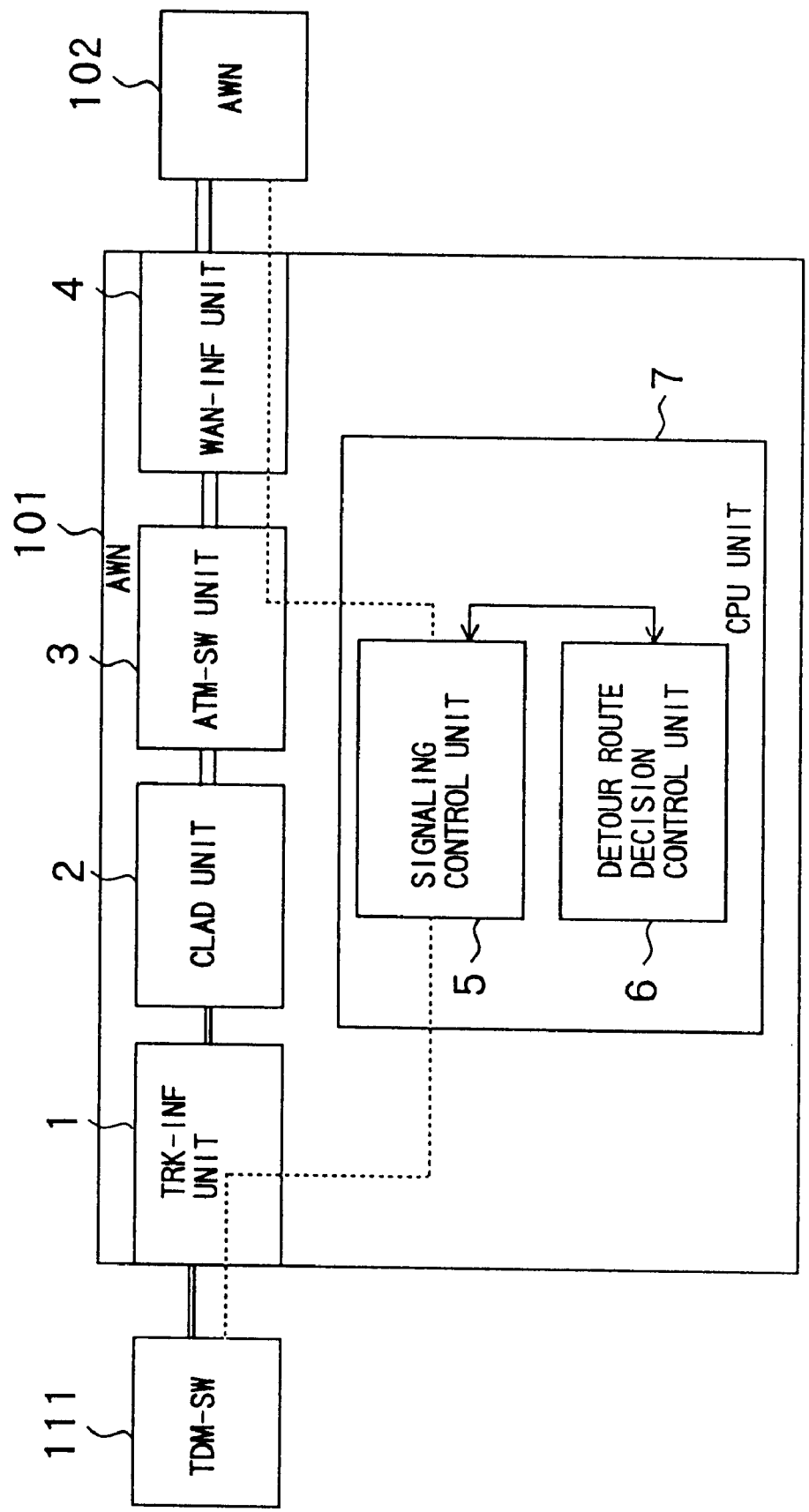
FIG. 2 is a diagram showing a construction of an ATM-WAN node shown in FIG. 1.

FIG. 2 is a diagram showing the construction of the AWN 101 illustrated in FIG. 1. Referring to FIG. 2, the AWN 101 is constructed of a TRK-INF (trunk interface) unit 1 connected to the TDM-SW 111, a CLAD (Cell Assembly and Disassembly) unit 2 connected to the TRK-INF unit 1, an ATM-SW unit 3 connected to the CLAD unit 2, a WAN-INF unit 4 connected to the ATM-SW unit 3, and a control unit 7 connected to the TRK-INF unit 1 and to the ATM-SW unit 3.

The TRK-INF unit 7 includes a TDM-SW line interface, and signaling of a TDM-SW line terminates with the TRK-INF unit 1. This TRK-INF unit 1 is connected via a control line to a signaling control unit 5. The CLAD unit 2 converts, into a cell, voice speech data stored in a TS (Time Slot) of the TDM-SW. Further, the CLAD unit 2 fetches the voice speech data from the cell.

The ATM-SW unit 3 executes the cell conversion. Further, the ATM-SW unit 3 terminals the signaling of the ATM line. The ATM-SW unit 3 is connected via a control line to the signaling control unit 5. The WAN-INF unit 4 has an interface of the ATM line and corresponds to locating of a WAN line device.

A control unit 7 is constructed of a CPU (Central Processing Unit), a memory device stored with a program executed by the CPU and with data used for executing this program and the like. The control unit 7 includes, as functions actualized by executing the program, the signaling control unit 5 and a detour route decision control unit 6.

Figure 3:
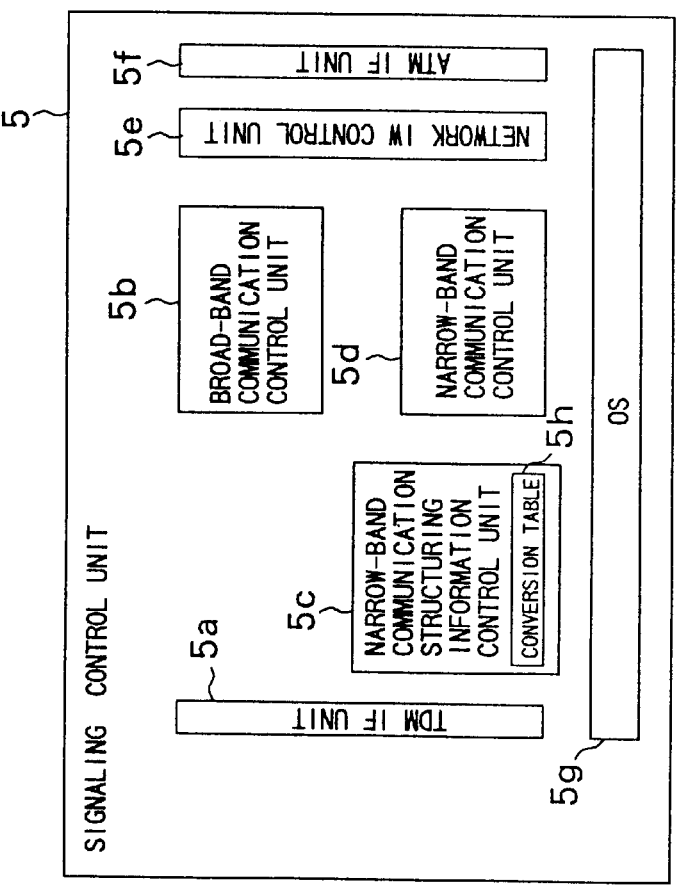
FIG. 3 is a diagram showing a construction of a signaling control unit shown in FIG. 2.

The signaling control unit 5 executes signaling control of the TDM-SW line and signaling control of the ATM line, and controls communications between the terminals (which correspond to a call setting unit, a judging unit, a first transmitting unit and a second transmitting unit according to the present invention). FIG. 3(*a*) is a functional block diagram of the signaling control unit 5 shown in FIG. 2. FIG. 3(*b*) is an explanatory diagram showing a conversion table 5*h* incorporated into a narrow-band communication structuring information control unit 5*c* shown in FIG. 3(*a*).

Referring to FIG. 3(*a*), the signaling control unit 5 comprises a TDM interface unit 5*a* connected to the TRK-INF unit 1, a broad-band communication control unit 5*b*, the narrow-band communication structuring information control unit 5*c*, a narrow-band communication control unit 5*d*, a network interwork control unit 5*e*, an ATM interface unit 5*f* connected to the WAN-INF unit 4, and an OS (Operation System) 5*g* for controlling these units. Hence, the narrow-band communication structuring information control unit 5*c* includes, as shown in FIG. 3(*b*), the conversion table 5*h* stored with narrow-band call-in node address numbers (identification numbers of the TDM-SWs) and broad-band ATM addresses.

Figure 4:
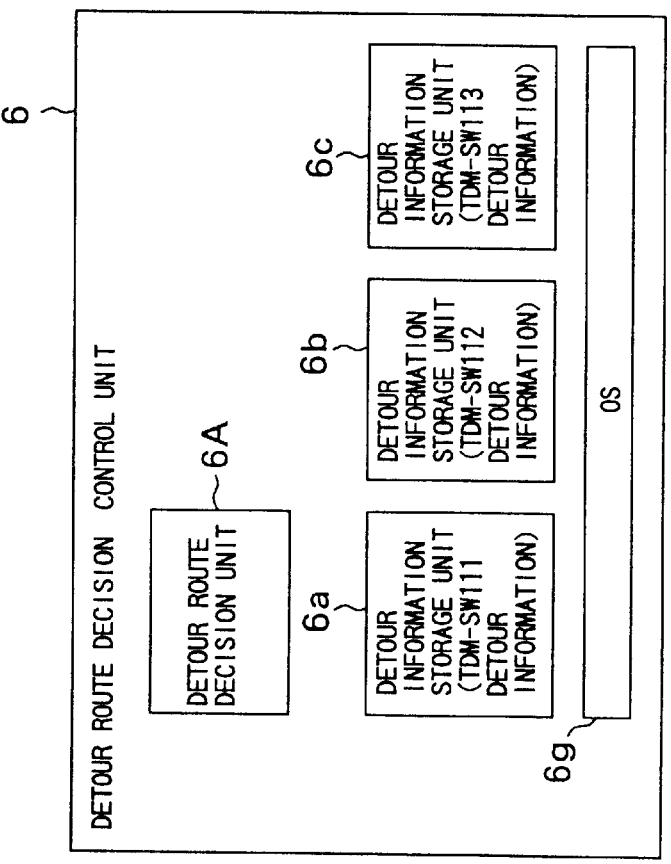
FIG. 4 is a diagram showing a construction of a detour route decision control unit shown in FIG. 2.

The detour route decision control unit 6 has detour information on the ATM network 100 and selects and decides a detour route meeting a predetermined selection condition from the detour information. FIG. 4(*a*) is a functional block diagram of the detour route decision control unit 6 shown in FIG. 2. FIGS. 4(*b*) and 4(*c*) an explanatory diagrams showing tables incorporated into detour information storage units 6*a*–6*c* illustrated in FIG. 4(*a*).

Referring to FIG. 4(*a*), the detour route decision control unit 6 comprises a detour route decision unit 6A, the detour information storage units 6*a*–6*c* and an OS (Operation System) 6*g*. The detour route decision unit 6A decides a detour route in accordance with an indication given from the OS 6*g*. The detour information storage units 6*a*–6*c* are provided corresponding to the TDM-SWs. The detour information storage unit 6*a* is stored with the detour information on the TDM-SW 111, The detour information storage unit 6*b* is stored with the detour information on the TDM-SW 112, and the detour information storage unit 6*c* is stored with the detour information on the TDM-SW 113.

Each of the detour information storage units 6*a*–6*c* has a narrow-band detour information table 6*h* and a public network charge management table 6*i* show in FIGS. 4(*b*) and 4(*c*). The narrow-band detour information table 6*h* is stored, as the detour information, with dial information (telephone numbers) and dial-in information of the respective terminal devices accommodated in the TDM-SWs in such a form as to correspond to each other. The public network charge management table 6*i* is stored with narrow-band call-in node address numbers and dial information (fees of a public network 116) which correspond to each other.

[Example of Operation in Network System]

Next, an example of operation in the network system illustrated in FIG. 1 is explained. Exemplified herein is the operation in a case where a terminal 114 communicates with a terminal 115. A process of the AWN 101 in each operational example is also explained.

When the terminal 114 transmits the data to the terminal 115, the terminal 114 transmits call information including call-in address information to the TDM-SW 111. The call information includes, as the call-in address information, an intra TDM network node address number "730" for specifying the TDM-SW 113, and an intra TDM-SW 113 terminal address number "2000" for specifying the terminal 115.

The TDM-SW 111, upon receiving the call information from the AWN 101, transmits to the terminal 114 a narrow-band call setting request message "N-SETUP (call setting)" containing call-in address information.

Figure 5:
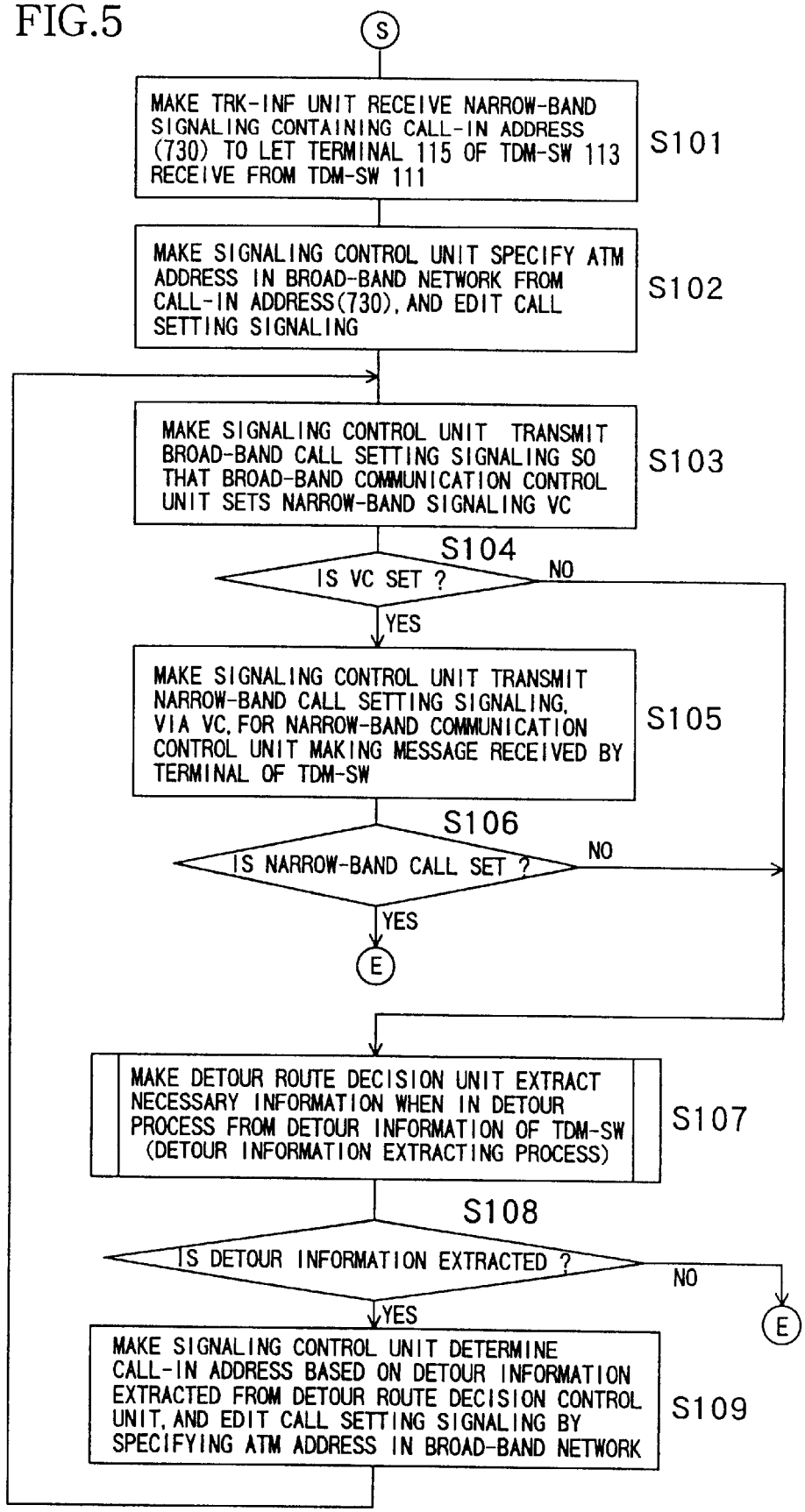
FIG. 5 is a flowchart showing processes of the ATM-WAN node shown in FIG. 1.

When the AWN 101 receives "N-SETUP", processes shown in a flowchart of FIG. 5 are executed. Namely, the TRK-INF unit 1 receives "N-SETUP" transmitted from the TDM-SW 111 (S101). Thereupon, the signaling control unit 5 show in FIGS. 2 and 3 performs transmission control of call setting signaling in accordance with procedures of [STR-VTOA-LLT-01.12] prescribed in ATM-Forum.

More specifically, in the signaling control unit 5, the TDM interface unit 5*a* receives the call-in address information from the TDK-INF unit 1. Subsequently, the narrow-band communication structuring information control unit 5*c* retrieves the conversion table 5*h* (see FIG. 3(*b*))with the intra call-in address information node address number "730" serving as a key, and detects an ATM address "awn3" of the AWN 103 in the broad-band network (ATM network 100).

Subsequently, the broad-band communication control unit 5*b* edits a broad-band call setting request message "B-SETUP" with respect to the ATM address "awn3"

(S102). Subsequent to this step, the broad-band communication control unit 5b sets a VC (narrow-band signaling transmission VC) for transmission of "N-SETUP" between the AWN 101 and the AWN 103, and hence "B-SETUP" is transmitted from the ATM interface unit 5f (S103).

Upon executing the process in step S103, "B-SETUP" is transmitted from the AWN 101 via the ATM-SW unit 3 and the WAN-INF unit 4. Thereafter, the AWN 101 is brought into a state of waiting for receiving one of response messages "B-CONN (call connection)" and "DISC (call disconnection)" ("REL (call release)") with respect to "B-SETUP" transmitted from the AWN 103.

On the other hand, the message "B-SETUP" transmitted from the AWN 101 is received by the AWN 103 via the AWN 102. At this time, if the narrow-band signaling transmission VC can be set between the AWN 101 and the AWN 103, the AWN 103 transmits the response message "B-CONN" towards the AWN 101, whereby the narrow-band signaling transmission VC is set between the AWN 101 and the AWN 103. Whereas if the narrow-band signaling transmission VC can not be set between the AWN 101 and the AWN 103 due to a fault or a deficiency of bandwidth in the ATM network 100, the AWN response message "DISC" towards the AWN 101.

Thereafter, when the AWN 101 receives the response message transmitted from the AWN 103, the signaling control unit 5 of the AWN 101 judges whether the response message is "B-CONN" or "DISC". That is, the signaling control unit 5 judges whether or not the narrow-band signaling transmission VC has been set between the AWN 101 and the AWN 103 (S104).

At this time, if the response message is judged to be "DISC", the signaling control unit 5 judges that the narrow-band signaling transmission VC has not been set between the AWN 101 and the AWN 103 (S104; NO). In this case, the processing by the AWN 101 advances to step S107.

By contrast, if the response message is judged to be "B-CONN", the signaling control unit 5 judges that the narrow-band signaling transmission VC has been set between the AWN 101 and the AWN 103 (S104; YES). In this case, the narrow-band communication control unit 5d of the signaling control unit 5 transmits the narrow-band call setting message "N-SETUP" for making the call setting request message received by the terminal 115 accommodated the TDM-SW 113 defined as a receiving side TDM-SW, by using the narrow-band signaling transmission VC (S105). This message "N-SETUP" contains the terminal address number "2000".

Upon executing the process in step S105, "N-SETUP" is transmitted from the AWN 101. Thereafter, the AWN 101 comes into a state of waiting for receiving the response messages "B-CONN" or "DISC" with respect to "N-SETUP".

On the other hand, "N-SETUP" transmitted from the AWN 101 is received by the AWN 103. Thereupon, the AWN 103 transmits call setting request message containing a retaining content of □N-SETUP□ to the TDM-SW 113.

When the call setting request message is received by the TDM-SW 113 from the AWN 103, the TDM-SW 113 transmits the call setting request to the terminal 115 on the basis of the terminal address number □2000" in □ON-SETUP□.

At this time, if the call is set between the TDM-SW 113 and the AWN 103 and between the TDM-SW 113 and the terminal 115, the TDM-SW 113 transmits to the AWN 103 a response message informing that the call has been set. The AWN 103, when receiving from the TDM-SW 113 the response message informing that the call has been set, transmits a response message "N-CONN" to "N-SETUP" toward the AWN 101.

Whereas if the call could not be set between the AWN 103 and the TDM-SW 113 or between the TDM-SW 113 and the terminal 115 due to a fault or a deficiency of bandwidth, the TDM-SW 113 transmits to the AWN 103 a response message informing that the call could not be set. The AWN 103, when receiving from the TDM-SW 113 the response message informing that call could not be set, transmits to the AWN 101 the response message "DISC" to "N-SETUP".

Thereafter, the response message transmitted from the TDM-SW 113 is received by the WAN-INF unit 4 of the AWN 101 via the AWN 102. At this time, it is judged whether the response message is "N-CONN" or "DISC", i.e., whether the narrow-band call is set or not (S106).

In this case, if the response message is "N-CONN", a message informing that the narrow-band call has been set, is transmitted to the TDM-SW 111, and the processing by the AWN 101 comes to an end. The call is thereby set between the terminal 114 and the terminal 115, and thereafter the data communications are carried out therebetween. By contrast, if the response message is "DISC", the processing by the AWN 101 advances to step S107.

Thus, when the AWN 101 receives the response message "DISC" to "B-SETUP" or "N-SETUP", the processing by the AWN 101 proceeds to step S107. Exemplified herein is a case where the AWN 103 receives the message "DISC" to "N-SETUP" because of a fault occurred in the TDM line through which the AWN 103 is connected to the TDM-SW 113.

Figure 6:
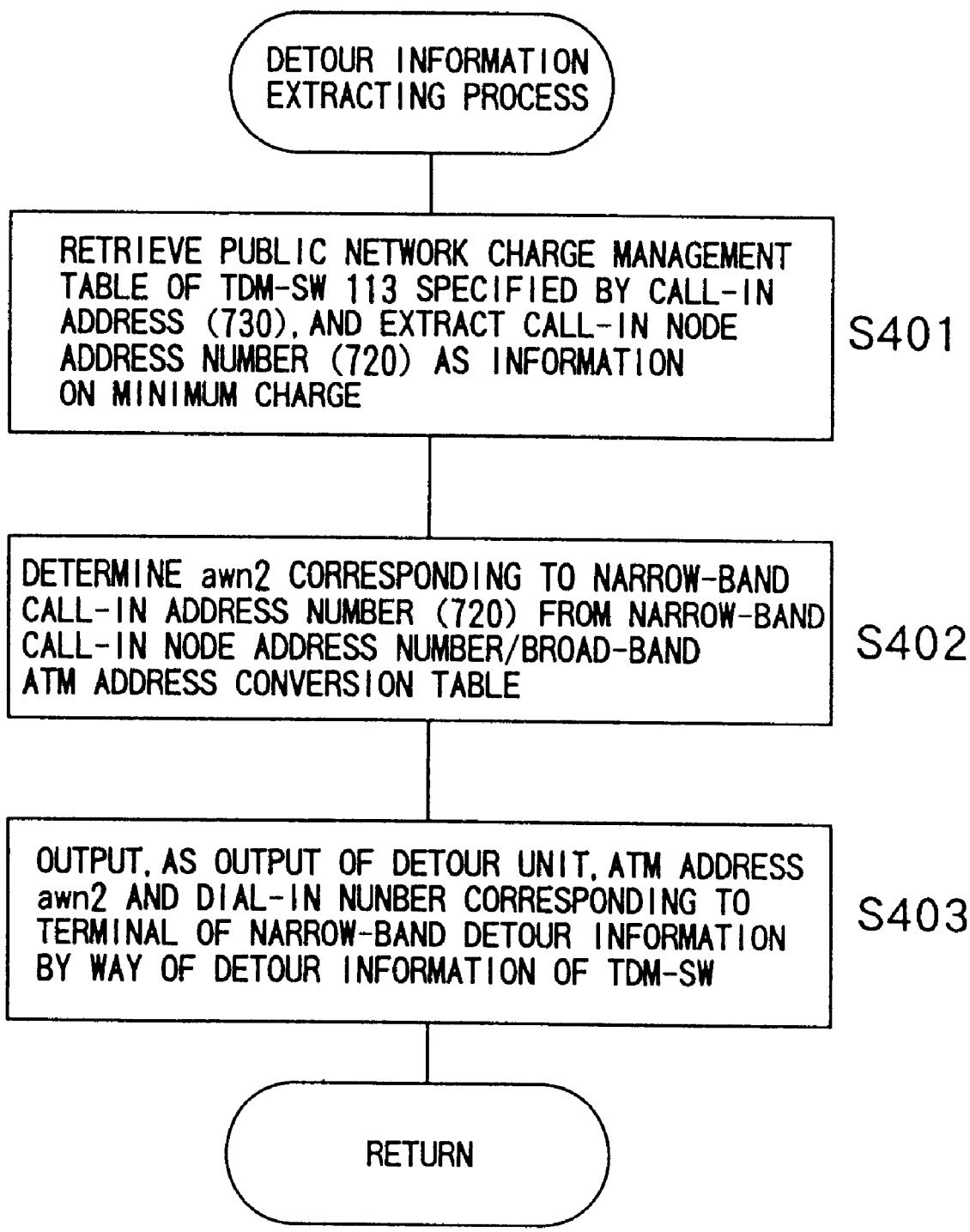
FIG. 6 is a flowchart showing processes of the ATM-WAN node shown in FIG. 1.

When the processing by the AWN 101 proceeds to step S107, in the AWN 101, the detour route decision control unit 6 (see FIG. 4) of the control unit 7 executes a detour information extraction process (S107). FIG. 6 is a flowchart showing a subroutine of the detour information extraction process. As shown in FIG. 6, the detour route decision unit 6A of the detour route decision control unit 6 extracts narrow-band route information from the detour information storage unit (which is the detour information storage unit 6c in the embodiment 1), corresponding to the call-in address information, of the detour information storage units 6a–6c.

More specifically, the detour route decision unit 6A extracts a node address number (excluding a call-in node address number (which is herein "730") with the lowest charge for using the public network 116, from the public network charge management table 6i shown in FIG. 4(c). In the embodiment 1, a node address number "720" corresponding to the lowest charge "10/min" is extracted.

Subsequently, the detour unit 6A retrieves the conversion table 5h (see FIG. 3(b)) with the node address number "720" extracted in step S401 serving as a key, and detects, as a call-in ATM address, an ATM address "awn2" corresponding to the node address number "720" (S402).

Subsequent to this step, the detour route decision unit 6A extracts, as detour information of the TDM-SW 113, the ATM address "awn2" and "044-777-1000" defined as dial-in information corresponding to the terminal 115 (S403). Thereafter, the subroutine of the detour information extraction process is finished, and the processing advances to step S109 of the main routine. Note that in the process in step S107, if stored with a plurality of items of detour information with respect to the terminal 115, one item of detour information is extracted based on a predetermined priority.

Thereafter, when the processing returns to the main routine, it is judged whether or not the detour route decision unit 6A extracts the detour information (S108). At this time, if the detour information is not extracted (S108; NO), the processing by the AWN 101 is ended, and the call is not established between the terminal 114 and the terminal 115.

Figure 7:
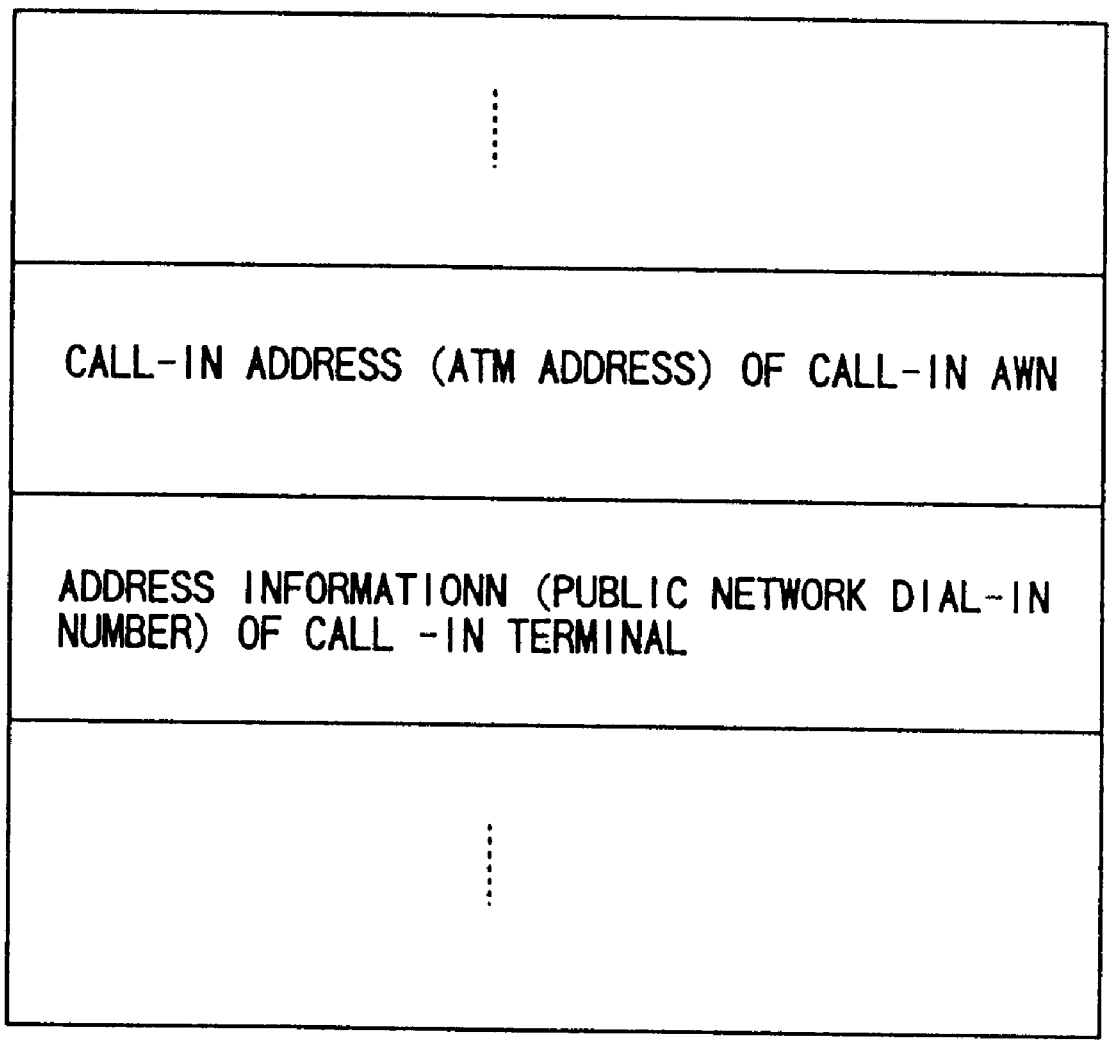
FIG. 7 is an explanatory diagram of a message transmitted from the ATM-WAN node.

Whereas if the detour information is extracted (S108; YES), the signaling control unit 5 executes the processes which follow. To be specific, the broad-band communication control unit 5b of the signaling control unit 5 edits "B-SETUP" with respect to the AWN 102. At this time, as shown in FIG. 7, "B-SETUP" is stored with the above-described ATM address "awn2" and the dial-in information "044-777-1000" (S109). Then, upon an end of the processing in step S109, the processing returns to step S103, wherein the edited message "B-SETUP" is transmitted to the AWN 102.

Thereafter, if the narrow-band signaling transmission VC is set between the AWN 101 and the AWN 102 (S104; YES), "N-SETUP" is transmitted to the AWN 102 from the AWN 101. Thereupon, the AWN 102 transmits a call setting request message with respect to "N-SETUP" to the TDM-SW 112. When the TDM-SW 112 receives the call setting request from the AWN 102, the TDM-SW 112 and the TDM-SW 113 set the call via the public network 116 on the basis of the dial-in information ꞏ044-777-1000". Further, the TDM-SW 113 and the terminal 115 set the call.

Thereafter, the TDM-SW 112 transmits to the AWN 102 a message informing that the call has been set. When this message is received by the AWN 102, the AWN 102 transmits to the AWN 101 the response message "N-CONN" to "N-SETUP". When the message "N-CONN" is received by the AWN 101, the AWN 101 infers that the narrow-band call (between the AWN 102 and the TDM-SW 112) is set, and the processes shown in FIG. 5 is ended.

Figure 8:
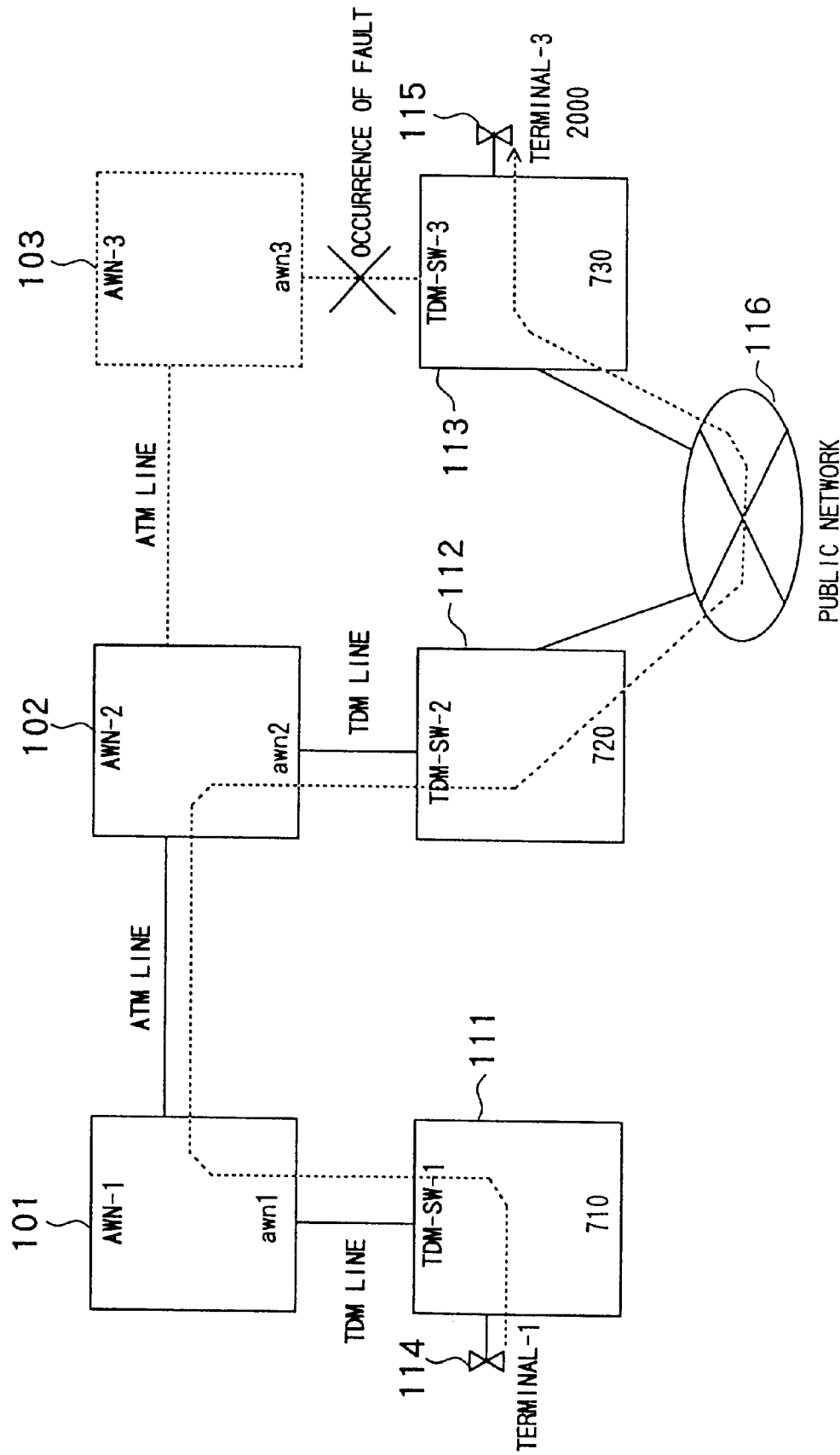
FIG. 8 is an explanatory diagram showing an example of an operation of the network system illustrated in FIG.
Figure 9:
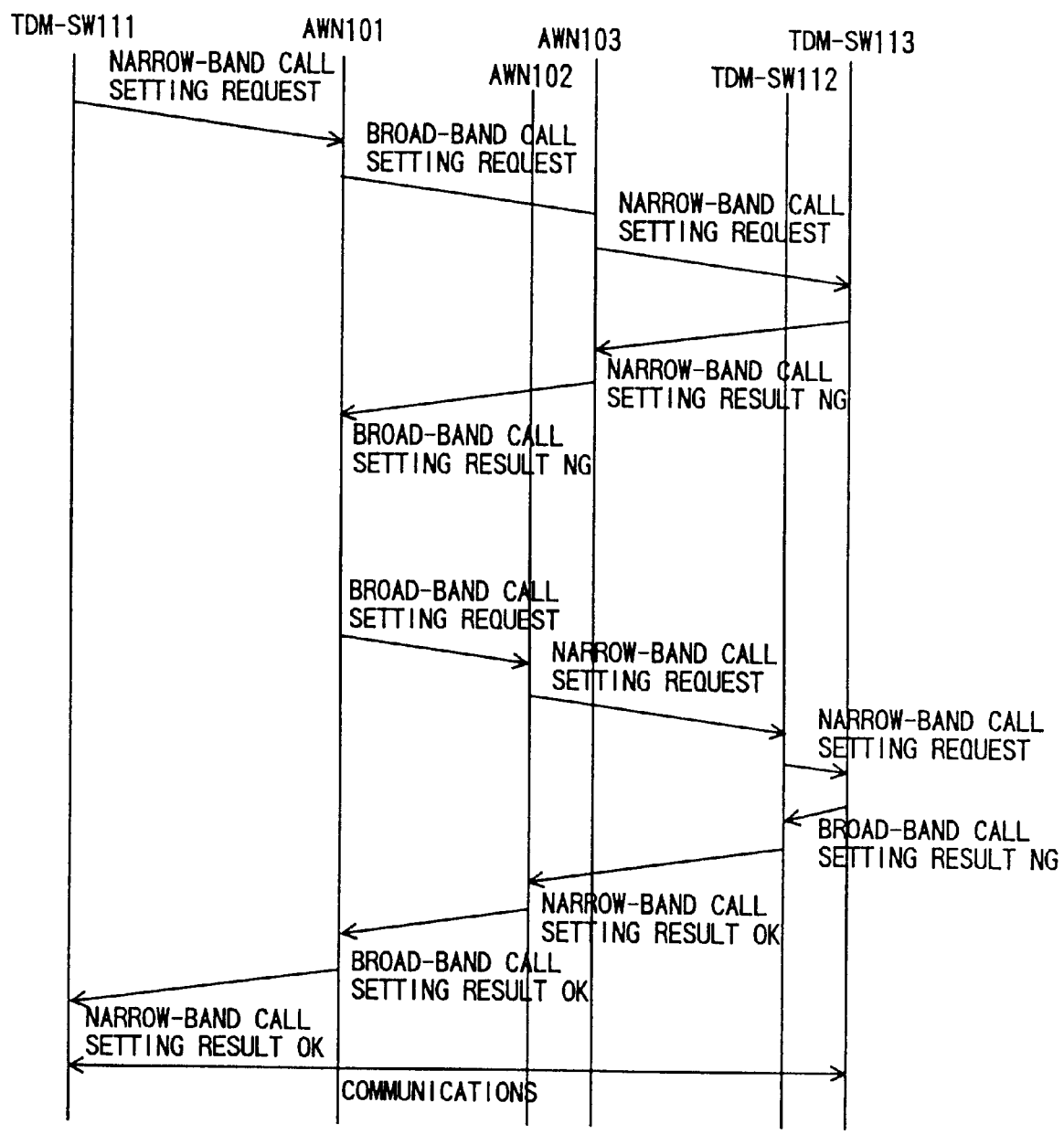
FIG. 9 is a sequence diagram showing the example of the operation of the network system illustrated in FIG. 1.

The call is thereby established through the route such as the terminal 114→the TDM-SW 111→the AWN 101 →the AWN 102→the TDM-SW 112→the public network 116 →the TDM-SW 113→the terminal 115 (see FIG. 8). Then, the data are communicated between the terminal 114 and the terminal 115 (see a sequence diagram shown in FIG. 9).

According to the embodiment 1, in the case where the data communications are conducted between the terminal 114 and the terminal 115, if the VC can not be set between the AWN 101 as a call-out AWN and the AWN 103 as a call-in AWN, or if the narrow-band call can not be set between the AWN 103 and the terminal 115, the detour route decision unit 6A of the AWN 101 determines, as a substitute AWN (a substitute communication device), the AWN 102 serving as the call-in AWN as a substitute for the AWN 103, and the detour route from the AWN 102 toward the terminal 115 is decided.

Thereafter, the narrow-band call is set along the route between the AWN 102 and the TDM-SW 113 (the terminal 115), and the call is established between the terminal 114 and the terminal 115. Thus, a detour function incorporated into the conventional TDM network can be actualized by the ATM network 100. It is therefore feasible to promote the utilization of the ATM network as a relay network of the TDM network.

Further, the detour route decision unit 6A extracts the node address number exhibiting the lowest charge for the public network 116, and a running cost of the network system can be restrained.

Note that each of the detour information storage units 6a–6c has the public network charge management table 6i in the embodiment 1. In this connection, each of the detour information storage units 6a–6c may have a TDM line capacity management table 6j shown in FIG. 10(a) in place of the public network charge management table 6i. Besides, a subroutine shown in FIG. 10(b) may be executed instead of the subroutine (see FIG. 6) in step S107.

Figure 10:
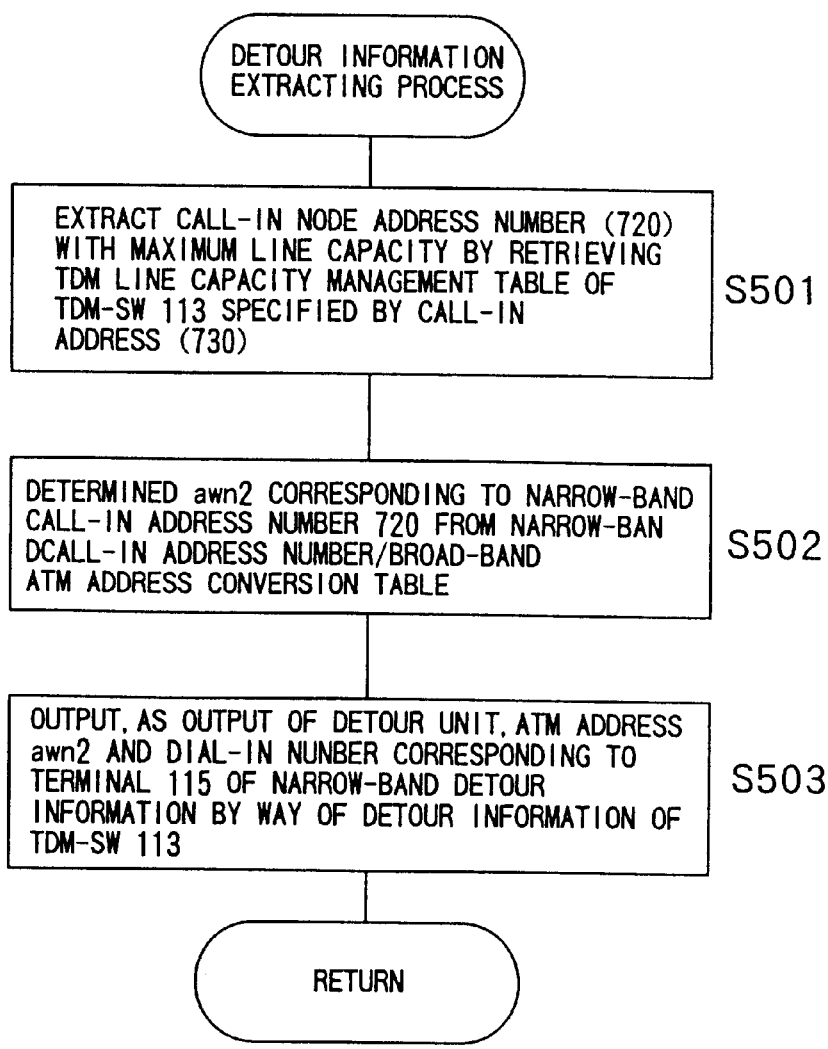
FIG. 10 is an explanatory diagram showing a modified embodiment of the embodiment 1.

Namely, according to the embodiment 1, in step S501 shown in FIG. 10(b), the detour route decision unit 6A may retrieve a TDM line capacity management table 6j corresponding to the TDM-SW 13 and extract the call-in node address number having a maximum capacity of the TDM line for connecting the AWN to the TDM-SW. Further, according to the embodiment 1, the detour route decision unit 6A may extract the node address number of the TDM-SW exhibiting a largest line capacity of the public network 116.

Moreover, a TDM line call loss rate management table 6k shown in FIG. 11(a) may be prepared in place of the public network charge management table 6i shown in FIG. 4(c), and a subroutine shown in FIG. 11(b) may be executed instead of the subroutine (see FIG. 6) in step S107. That is, in step S601 shown in FIG. 11(b), the detour route decision unit 6A may retrieve the TDM line call loss rate management table 6k corresponding to the TDM-SW 113 and extract the narrow-band call-in node address number exhibiting a minimum call loss rate.

Further, a TDM line congestion state management table 6l shown in FIG. 12(a) may be prepared in place of the public network charge management table 6i shown in FIG. 4(c), and a subroutine shown in FIG. 12(b) may be executed instead of the subroutine (see FIG. 6) in step S107. That is, in step S701 shown in FIG. 12(b), the detour route decision unit 6A may retrieve the TDM line congestion state management table 6l corresponding to the TDM-SW 113 and extract the narrow-band call-in node address number with no congestion. It is to be noted that a storage content in the TDM line congestion state management table 6l is changed corresponding to a resources using condition (a traffic condition) managed by a resource control unit (not shown) actualized by the control unit 7.

Thus, when the detour route decision unit 6A is constructed to implement the detour route (to decide the substitute AWN) corresponding to the line capacity, the call loss rate or the congestion state, it is feasible to actualize the detour function in the ATM network 100 while keeping the intra ATM network 100 traffic in a proper range.

[Embodiment 2]

Next, the network system in an embodiment 2 of the present invention will be described. The embodiment 2 is, however, substantially the same as the embodiment 1, and hence the explanation is concentrated upon differences therebetween. In the embodiment 2, each of the TDM-SW 111–113, 117 incorporates a busy advance function (to make a specified TDM-SW or terminal receive the call in response to a request).

Further, the detour information storage units 6a–6c of the detour route decision control unit 6 of each of the AWNs 101–103 have, as a substitute for the tables 6h, 6i shown in FIGS. 4(b) and 4(c), a busy advance table 6m shown in FIG. 13. As illustrated in FIG. 13, the busy advance table 6m is stored in such as a form as to correspond to the receiving side TDM-SWs, as the detour information, with information indicating whether or not each of the TDM-SWs 111–113, 117 is possible of executing the busy advance function.

Figure 14:
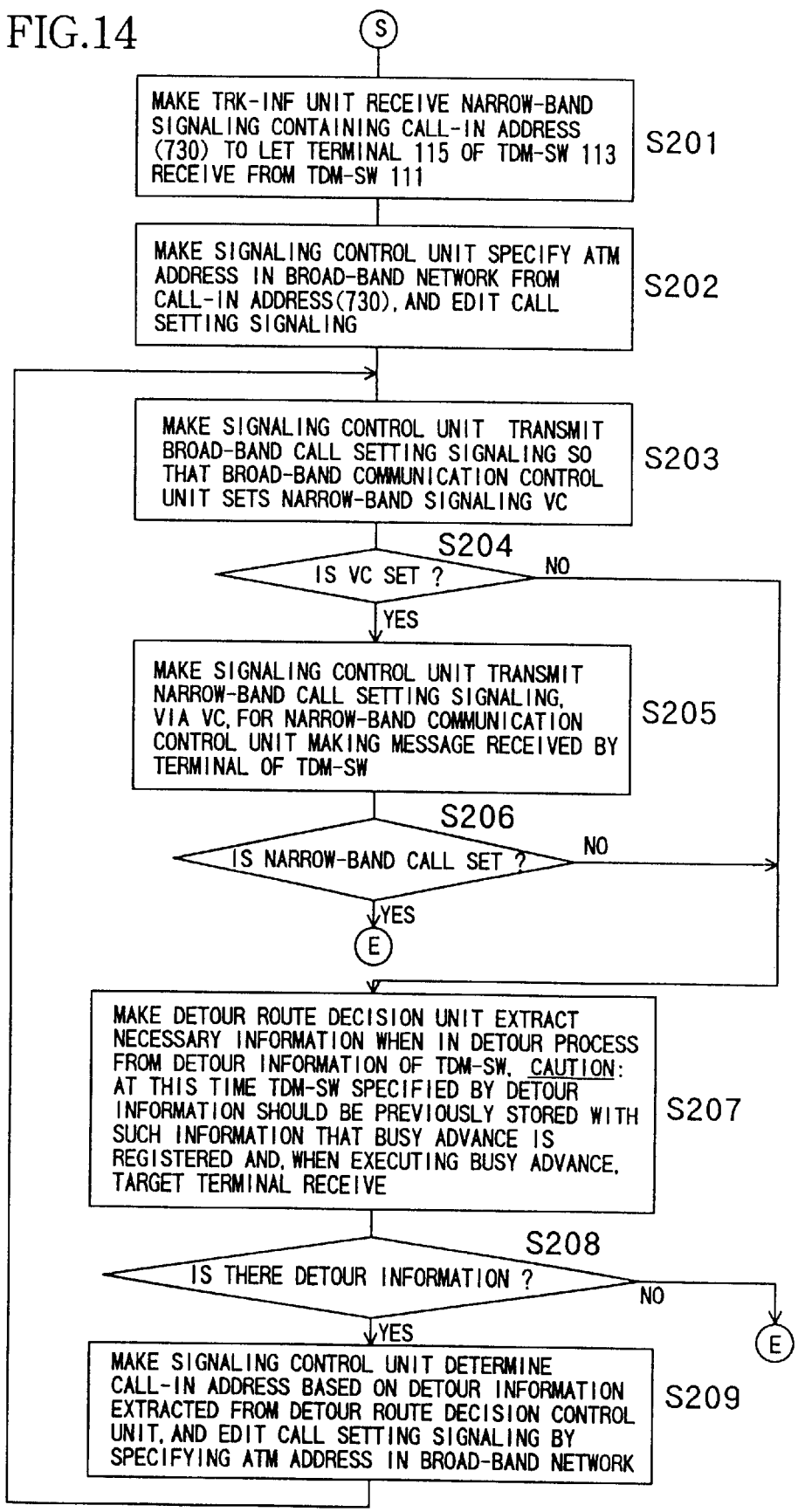
FIG. 14 is a flowchart showing processes of the ATM-WAN node in the embodiment 2.

Explained next is an example of operation in the network system in the embodiment 2. FIG. 14 is a flowchart showing the processing by the AWN 101 in the embodiment 2. FIG. 14 shows the processing by the AWN 101 when performing the data communications between the terminal 114 and the terminal 115 in the network system shown in FIG. 1.

Referring to FIG. 14, processes in steps S201–S206 are the same as the processes in steps S101–S106 shown in FIG. 5, and hence their explanation is omitted. Thereafter, a judgement of "NO" is made in step S204 or S206, and the processing proceeds to step S207, in which case the detour route decision unit 6A of the AWN 101 retrieves the busy advance table 6m (see FIG. 9) contained the detour information storage unit 6c, thus detecting the information required the storage unit 6c. Thereby the unit 6A obtains information of "The call can be received by the terminal 115 of the TDM-SW 113 with the busy advance function executed by the TDM-SW 112" from the storage unit 6c.

Thereupon, in the AWN 101, the narrow-band communication structuring information control unit 5c detects the broad-band ATM address "awn2" of the AWN 102 which corresponds to the node address "720" of the TDM-SW 112 from the conversion table 5h shown in FIG. 3(b), as call-in address information of a call setting message received from the TDM-SW 111. Next, the broad-band communication control unit 5b edits the call setting message (S209). At this time, a busy advance execution notification (purporting a request for the TDM-SW 112 to execute the busy advance function) is added, as addition information, to the call setting message.

Thereafter, in step S203, the call setting message is transmitted from the AWN 101. This call setting message is received by the TDM-SW 112 (of which the address is ▯720"). Thereupon, the TDM-SW 112 executes the busy advance function, and the call setting request is received by the terminal 115 via the TDM-SW 113. The call using the detour route is thereby established between the terminal 114 and the terminal 115, and the data communications are thus conducted.

Note that the detour route is established using the detour information stored in the busy advance table 6m in the embodiment 2, however, the detour information storage units 6a–6c may include the tables 6h, 6i shown in FIGS. 4(b) and 4(c) and the busy advance table 6m, and the detour route is established using the detour information stored in the table 6h, 6i shown in FIGS. 4(b) and 4(c) and, if not established at a first stage, may also be established at a second stage using the detour information stored in the busy advance table 6m.

Figure 15:
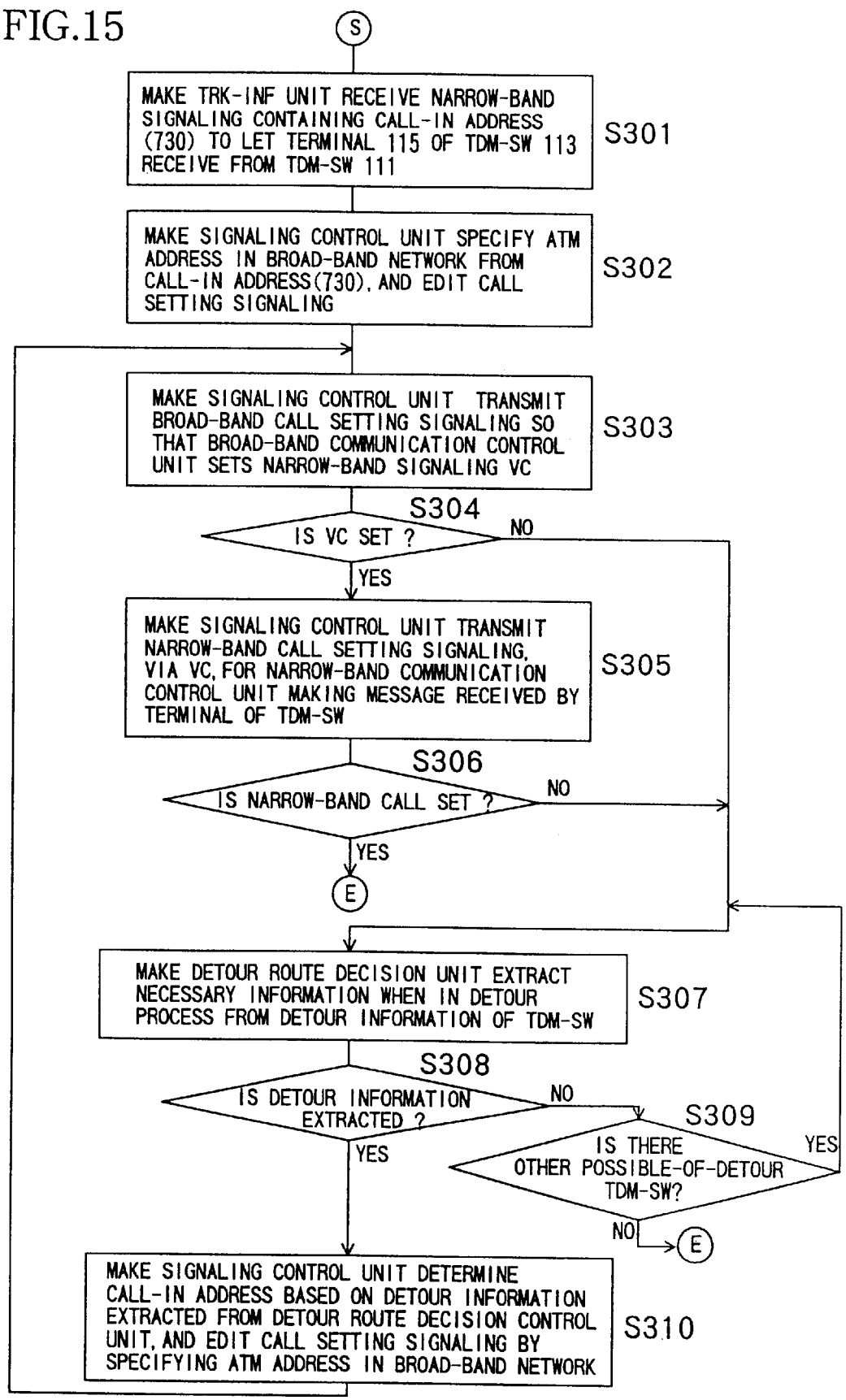
FIG. 15 is a flowchart showing a modified embodiment of the embodiment 2.
Figure 16:
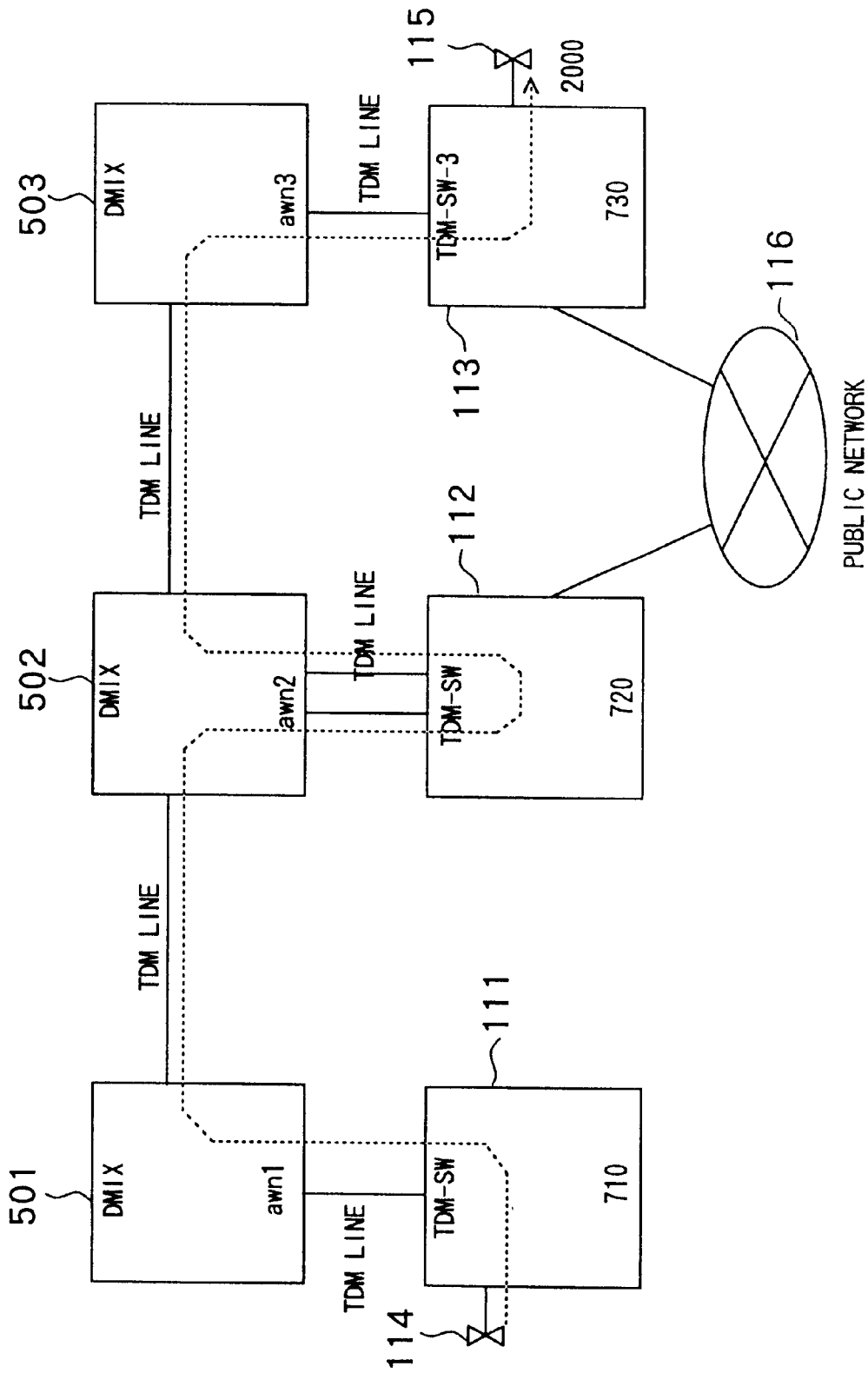
FIG. 16 is a diagram illustrating an example of a construction of a conventional TDM network in the prior art.
Figure 17:
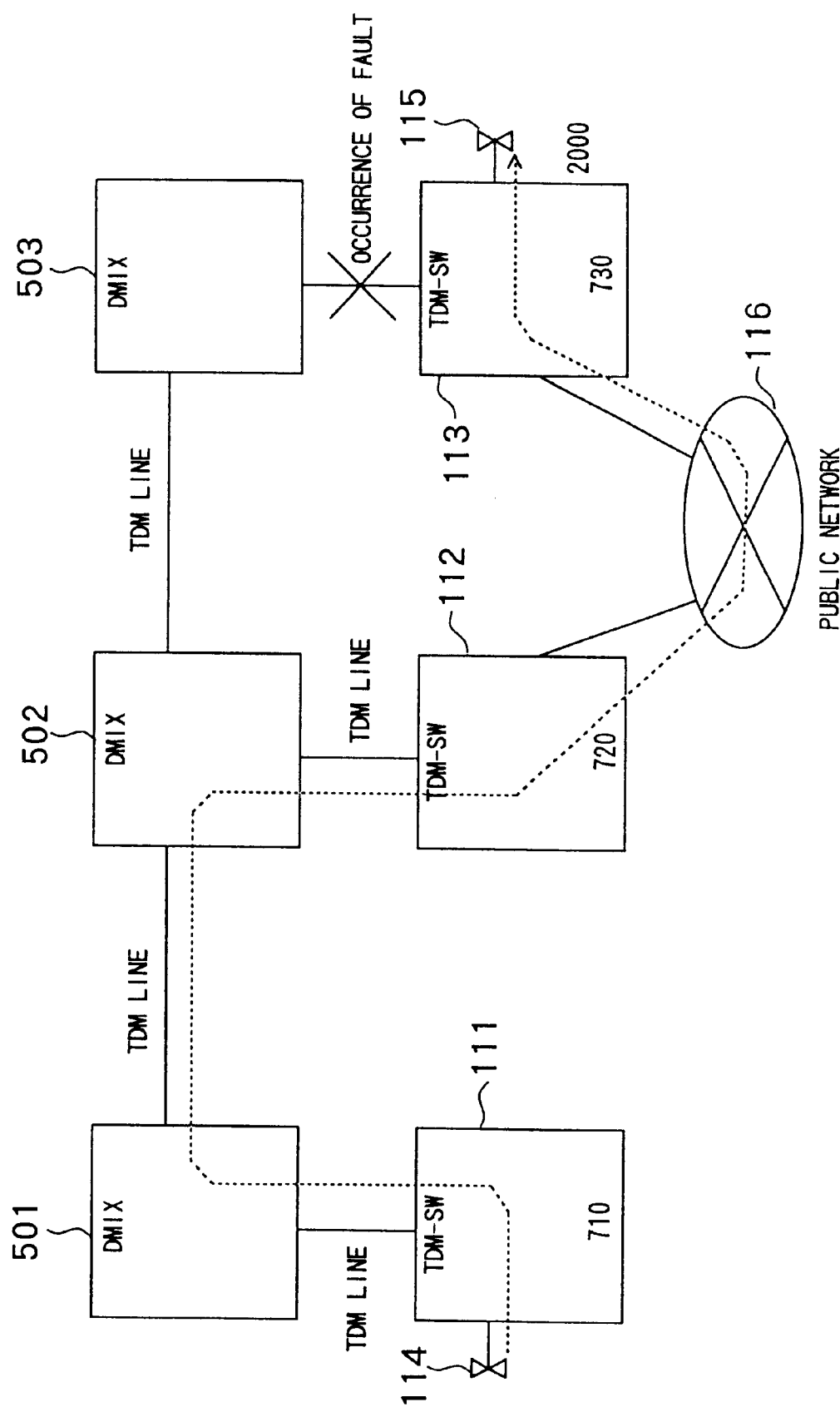
FIG. 17 is an explanatory diagram of a detour function in the TDM network illustrated in FIG. 16.

For example, as shown in FIG. 15, the necessary detour information is retrieved from the tables 6h, 6i in FIGS. 4(b) and 4(c) in step S307, and, if the detour information can not be extracted from the tables 6h, 6i (S308; NO), it is judged whether or not there is the busy advance table 6h (S309). If the busy advance table 6h exists (S309; YES), a contrivance may be such that the detour information is extracted from the busy advance table 6h. With this contrivance, the routing method can be changed corresponding to the condition of the ATM network 100, and hence the detour function by the ATM network 100 (AWNs) can be actualized more properly.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A network system comprising:

a TDM network including a plurality of TDM switches connected via TDM lines to each other; and an ATM network including a plurality of communication devices connected via the TDM lines in such a state as to be paired with said TDM switches, each of said communication devices, comprising:

first call setting means for setting, when receiving a call setting request message from said transmitting side TDM switch, a call between said communication device and a receiving side communication device paired with said receiving side TDM switch indicated by the call setting request message;

specifying means for specifying, if said first call setting means is unable to set the call, any one of TDM switches excluding said receiving side TDM switch, as a detour TDM switch;

storing means stored with detour information for setting the call between said detour TDM switch specified by said specifying means and said receiving side TDM switch;

reading means for reading the detour information when said specifying means specifies said detour TDM switch;

second call setting means for setting a call between said communication device and a detour communication device defined as a communication device paired with said detour TDM switch specified by said specifying means; and means for making, when said second call setting means sets the call, said detour communication device transmit a call setting request message containing the detour information read by said reading means to said detour TDM switch, wherein said detour TDM switch sets the call between said detour TDM switch and said receiving side TDM switch on the basis of the detour information contained in the call setting request message received from said detour communication device.

2. A network system comprising:

a TDM network including a plurality of TDM switches connected via TDM lines to each other;

an ATM network including a plurality of communication devices connected via the TDM lines in such a state as to be paired with said TDM switches; and a public network connected to said plurality of TDM switches, each of said communication devices, comprising:

first call setting means for setting, when receiving a call setting request message from said transmitting side TDM switch, a call between said communication device and a receiving side communication device paired with said receiving side TDM switch indicated by the call setting request message;

specifying means for specifying, if said first call setting means is unable to set the call, any one of TDM switches excluding said receiving side TDM switch, as a detour TDM switch;

storing means stored with detour information for setting the call between said detour TDM switch specified by said specifying means and said receiving side TDM switch;

reading means for reading the detour information when said specifying means specifies said detour TDM switch;

second call setting means for setting a call between said communication device and a detour communication device defined as a communication device paired with said detour TDM switch specified by said specifying means; and means for making, when said second call setting means sets the call, said detour communication device transmit a call setting request message containing the detour information read by said reading means to said detour TDM switch, wherein said detour TDM switch sets the call via said public network between said detour TDM switch and said receiving side TDM. switch on the basis of the detour information contained in the call setting request message received from said detour communication device.

3. A network system according to claim 1, wherein each of said communication devices further comprises third call setting means for setting, when said first call setting means sets the call, a call between said receiving side communication device and said receiving side TDM switch, and said specifying means specifies said detour TDM switch when said third call setting means is unable to set the call.

4. A communication device, an ATM network being provided with a plurality of pieces, connected via a TDM line to a specified TDM switch among a plurality of TDM switched constituting a TDM network in such a state as to be paired with said specified TDM switch, said communication device comprising:

first call setting means for setting, when receiving a call setting request message from said specified TDM switch as a transmitting side TDM switch, a call between said communication device and a receiving side communication device paired with said receiving side TDM switch indicated by the call setting request message;

specifying means for specifying, if said first call setting means is unable to set the call, any one of TDM switches excluding said receiving side TDM switch, as a detour TDM switch;

storing means stored with detour information for setting the call between said detour TDM switch specified by said specifying means and said receiving side TDM switch;

reading means for reading the detour information when said specifying means specifies said detour TDM switch;

second call setting means for setting a call between said communication device and a detour communication device defined as a communication device paired with said detour TDM switch specified by said specifying means; and means for making, when said second call setting means sets the call, said detour communication device transmit a call setting request message containing the detour information read by said reading means to said detour TDM switch.

5. A communication device according to claim 4, further comprising:

third call setting means for setting, when said first call setting means sets the call, a call between said receiving side communication device and said receiving side TDM switch, wherein said specifying means specifies said detour TDM switch when said third call setting means is unable to set the call.

6. A communication device according to claim 4, further comprising:

charge information storing means stored with information on a charge for using said public network which is collected when a call is set via said public network between each said TDM switch and said receiving side TDM switch as charge information, wherein said specifying means reads out charge information exhibiting a minimum charge for using said public network from said charge information storing means, and specifies a TDM switch corresponding to the read charge information as said detour TDM switch.

7. A communication device according to claim 4, further comprising:

capacity information storing means stored with information on a capacity of each said TDM line for connecting a TDM switch to a communication device as capacity information, wherein said specifying means reads out cpacity information exhibiting a maximum capacity of the TDM line from said capacity information storing means, and specifies a TDM switch corresponding to the read capacity information as said detour TDM switch.

8. A communication device according to claim 4, further comprising:

congestion information storing means stored with information on a congestion state of each said TDM line for connecting a TDM switch to a communication device as congestion information, wherein said specifying means reads out congestion information a state of minimum congestion from said congestion information storing means, and specifies a TDM switch corresponding to the read congestion information as said detour TDM switch.

9. A communication device according to claim 4, further comprising:

call loss rate information storing means stored with information on a call loss rate of each said TDM line for connecting a TDM switch to a communication device as call loss rate information, wherein said specifying means reads out call loss rate information exhibiting a minimum call loss rate from said call loss rate information storing means, and specifies a TDM switch corresponding to the read call loss rate information as said detour TDM switch.

10. A communication device according to claim 4, wherein said detour information is dial-in information of a terminal device accommodated in said receiving side TDM switch.

11. A communication device according to claim 4, wherein said detour information is busy advance information for requesting said detour TDM switch to make the call setting request message received by said receiving side TDM switch.

12. A method of changing a call setting route in a network system including a TDM network including: a plurality of TDM switches connected via TDM lines to each other; and an ATM network including a plurality of communication devices connected via the TDM lines in such a state as to be paired with said TDM switches, said method comprising:

a first step of setting, when said communication device receives a call setting request message from said transmitting side TDM switch, a call between said communication device and a receiving side communication device paired with said receiving side TDM switch indicated by the call setting request message;

a second step of specifying, if the call can not be set in said first step, any one of TDM switches excluding said receiving side TDM switch, as a detour TDM switch;

a third step of reading, when said detour TDM switch is specified in said second step, detour information for setting the call between said detour TDM switch and said receiving side TDM switch;

a fourth step of setting a call between said communication device and a detour communication device defined as a communication device paired with said detour TDM switch specified in said second step;

a fifth step of making, when the call is set in said fourth step, said detour communication device transmit a call setting request message containing the detour information read in said third step to said detour TDM switch; and a sixth step of making said detour TDM switch set the call between said detour TDM switch and said receiving side TDM switch on the basis of the detour information contained in the call setting request message received from said detour communication device.

13. A method of changing a call setting route in a network system including a TDM network including: a plurality of TDM switches connected via TDM lines to each other; an ATM network including a plurality of communication devices connected via the TDM lines in such a state as to be paired with said TDM switches; and a public network connected to said plurality of TDM switches, said method comprising:

a first step of setting, when said communication device receives a call setting request message from said transmitting side TDM switch, a call between said communication device and a receiving side communication device paired with said receiving side TDM switch indicated by the call setting request message;

a second step of specifying, if the call can not be set in said first step, any one of TDM switches excluding said receiving side TDM switch, as a detour TDM switch;

a third step of reading, when said detour TDM switch is specified in said second step, detour information for setting the call between said detour TDM switch and said receiving side TDM switch;

a fourth step of setting a call between said communication device and a detour communication device defined as a communication device paired with said detour TDM switch specified in said second step;

a fifth step of making, when the call is set in said fourth step, said detour communication device transmit a call setting request message containing the detour information read in said third step to said detour TDM switch; and a sixth step of making said detour TDM switch set the call via said public network between said detour TDM switch and said receiving side TDM switch on-the basis of the detour informatibn contained in the call setting request message received from said detour communication device.

14. A method of changing a call setting route according to claim 12, further comprising:

a seventh step of setting, when the call is set in said first step, a call between said receiving side communication device and said receiving side TDM switch, wherein said second step is executed when the call can not be set in said seventh step.

15. A method of changing a call setting route according to claim 13, wherein said second step is to specify a TDM switch in which a charge of using said public network is minimum, when a call is set via said public network between each said TDM switch and said receiving side TDM switch, as said detour TDM switch.

16. A method of changing a call setting route according to claim 12, wherein said second step is to specify a TDM switch in which a capacity of a TDM line connecting between this TDM switch and a communication device paired with this TDM switch is maximum, as said detour TDM switch.

17. A method of changing a call setting route according to claim 12, wherein said second step is to specify a TDM switch in which a state of congestion between this TDM switch and a communication device paired with this TDM switch is minimum, as said detour TDM switch.

18. A method of changing a call setting route according to claim 12, wherein said second step is to specify a TDM switch call loss rate between this TDM switch and a communication device paired with this TDM switch is minimum, as said detour TDM switch.

* * * * *